United States Patent
Yao et al.

(10) Patent No.: US 11,480,233 B2
(45) Date of Patent: Oct. 25, 2022

(54) PLANETARY SPEED-CHANGE MECHANISM

(71) Applicant: Li-Ho Yao, Taipei (TW)

(72) Inventors: Li-Ho Yao, Taipei (TW); Norman Lien, Taipei (TW); Chi-Chen Tien, Taipei (TW); Pei-Sheng Hsieh, Taipei (TW)

(73) Assignee: Li-Ho Yao, Taipei (TW)

( * ) Notice: Subject to any disclaimer, the term of this patent is extended or adjusted under 35 U.S.C. 154(b) by 0 days.

(21) Appl. No.: 17/408,492

(22) Filed: Aug. 23, 2021

(65) Prior Publication Data

US 2022/0065335 A1 Mar. 3, 2022

(30) Foreign Application Priority Data

Aug. 27, 2020 (TW) ................................ 109129396

(51) Int. Cl.
| | |
|---|---|
| *F16H 3/48* | (2006.01) |
| *F16H 3/58* | (2006.01) |
| *F16H 3/00* | (2006.01) |
| *F16H 57/00* | (2012.01) |
| *F16H 57/023* | (2012.01) |
| *F16H 57/08* | (2006.01) |

(52) U.S. Cl.
CPC .............. *F16H 3/58* (2013.01); *F16H 3/001* (2013.01); *F16H 57/0018* (2013.01); *F16H 57/023* (2013.01); *F16H 57/08* (2013.01)

(58) Field of Classification Search
CPC ........ F16H 3/58; F16H 3/001; F16H 57/0018; F16H 57/023; F16H 57/08; F16H 3/48; F16H 2200/0034; F16H 2200/2007; F16H 2200/2033; F16H 200/2066

USPC .......................................... 475/324, 323, 325
See application file for complete search history.

(56) References Cited

U.S. PATENT DOCUMENTS

| | | | | |
|---|---|---|---|---|
| 2,269,020 | A * | 1/1942 | Hayes | 477/121 |
| 2,301,072 | A * | 11/1942 | Nardone | F02B 33/00 |
| | | | | 475/307 |
| 4,281,565 | A * | 8/1981 | Lower | F16H 3/721 |
| | | | | 475/323 |
| 4,862,770 | A * | 9/1989 | Smith | F02B 67/04 |
| | | | | 475/324 |

(Continued)

FOREIGN PATENT DOCUMENTS

CN 106594239 A * 4/2017

*Primary Examiner* — Sherry L Estremsky
(74) *Attorney, Agent, or Firm* — Leong C. Lei

(57) ABSTRACT

A speed-change mechanism includes an output shaft on which a transmission module and a speed step-up module are mounted. The transmission module includes a driving roller that drives the output shaft in a single direction. The speed step-up module includes a connecting gear and a speed step-up gear that are rotatably and fixedly mounted to the output shaft, respectively, and a planet speed-change wheel assembly arranged therebetween. The speed step-up module includes an arrestor assembly. At a low speed, the planet speed-change wheel assembly is idling as being set in an orbiting motion and input power is suppled through the driving roller driving the output shaft in the single direction; and at a high speed, the arrestor assembly stops the orbiting motion of the planet speed-change wheel assembly to allow the speed-change gear of the planet speed-change wheel assembly to switch to a spinning motion to step up the speed.

14 Claims, 5 Drawing Sheets

(56) References Cited

U.S. PATENT DOCUMENTS 5,139,468 A * 8/1992 Churchill .................. F16H 3/56
475/311
5,328,419 A * 7/1994 Motl ........................ F16H 3/56
475/338

* cited by examiner

US 11,480,233 B2

PLANETARY SPEED-CHANGE MECHANISM

TECHNICAL FIELD OF THE INVENTION

The present invention relates to a speed-change mechanism, and more particularly to a planetary speed-change mechanism.

DESCRIPTION OF THE PRIOR ART

Speed changers that are currently available in the market include two types, one of which is a gear train-based speed changer that has a good efficiency in power transferring, but has a complicated structure and thus high cost and being hard to service, and may easily generate pause during speed transferring due to increase or decrease of speed being performed in a short period of time. The other type is a continuously variable transmission (CVT) device, which has a simplified structure so as to reduce the cost and being easy to service, but has a poor efficiency in power transferring. Further, for a clutch-based speed changer that is also known in the market requires electrical components and wires arranged in the interior of a clutch. This complicates the structure and expand the size. Further, the force of a clutch is generally provided by magnetic forces of electromagnetism and coupling of a stationary part and a rotating part is achieved with friction, and thus leading to a great loss of kinetic energy and being hard to achieve power transmission. Further, there is a window period of discontinuity in changing speed and this may easily cause a feeling of pause during the process of changing speed, making the practical utilization of the speed changer deteriorating. In brief, the existing speed changers suffer problems of structure complication, difficulty of service or replacement, being hard to establish power transmission, and being of poor speed change performance and all these make the existing speed changers unreliable in practical uses.

SUMMARY OF THE INVENTION

The present invention may effectively simplify the structure, effectively reduce cost and failure rate and is easy for service and replacement to carry out.

The present invention allows power to directly transfer without interruption in order to make the operation of speed change efficient and causes no loss of kinetic energy, so that the efficiency and reliability of speed change is enhanced.

The present invention allows direct change of speed, without causing any feeling of pause or interruption, so as to enhance smoothness of speed change.

DETAILED DESCRIPTION OF THE PREFERRED EMBODIMENT

Figure 1:
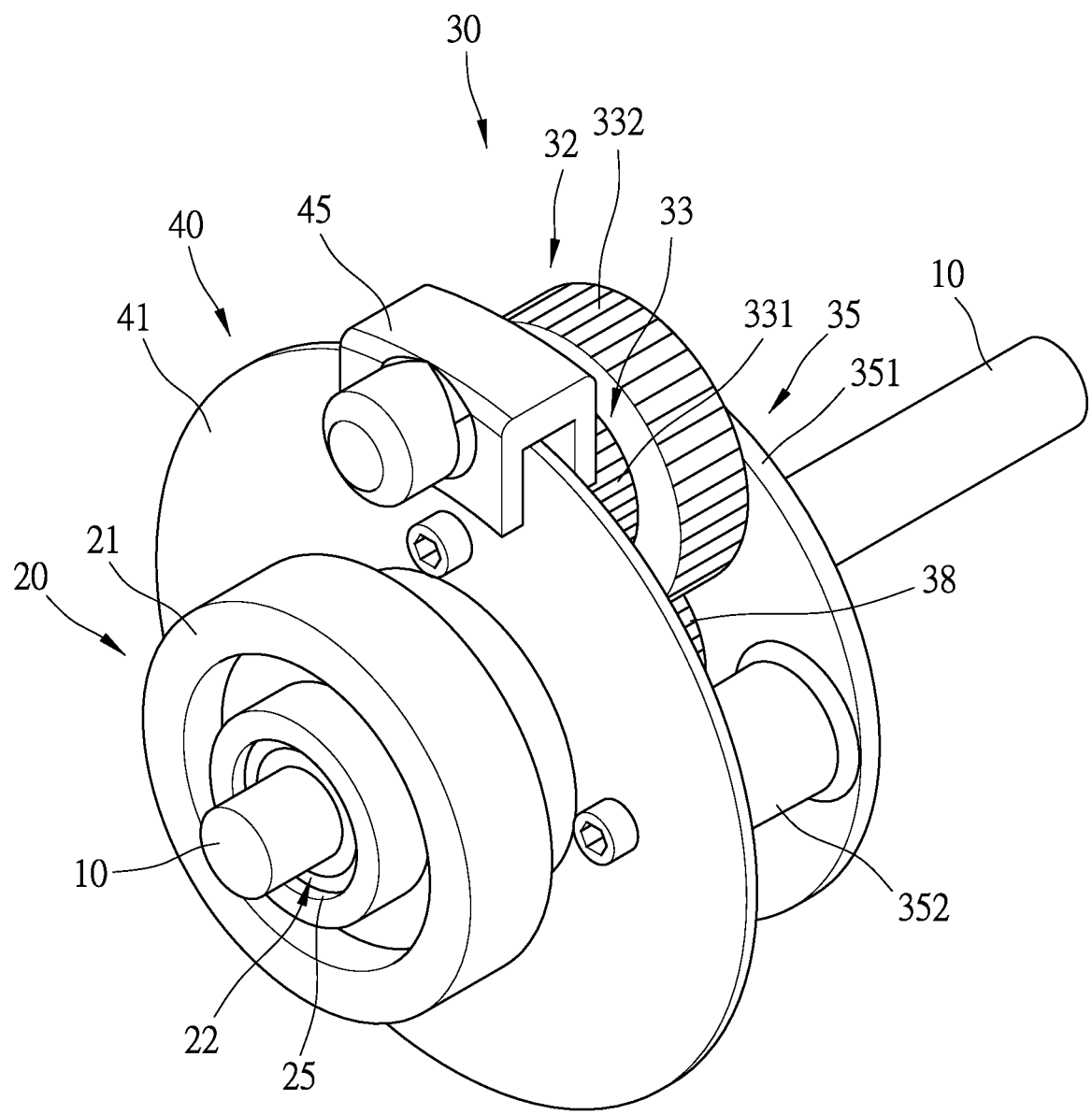
FIG. 1 is a perspective view of the present invention.
Figure 2:
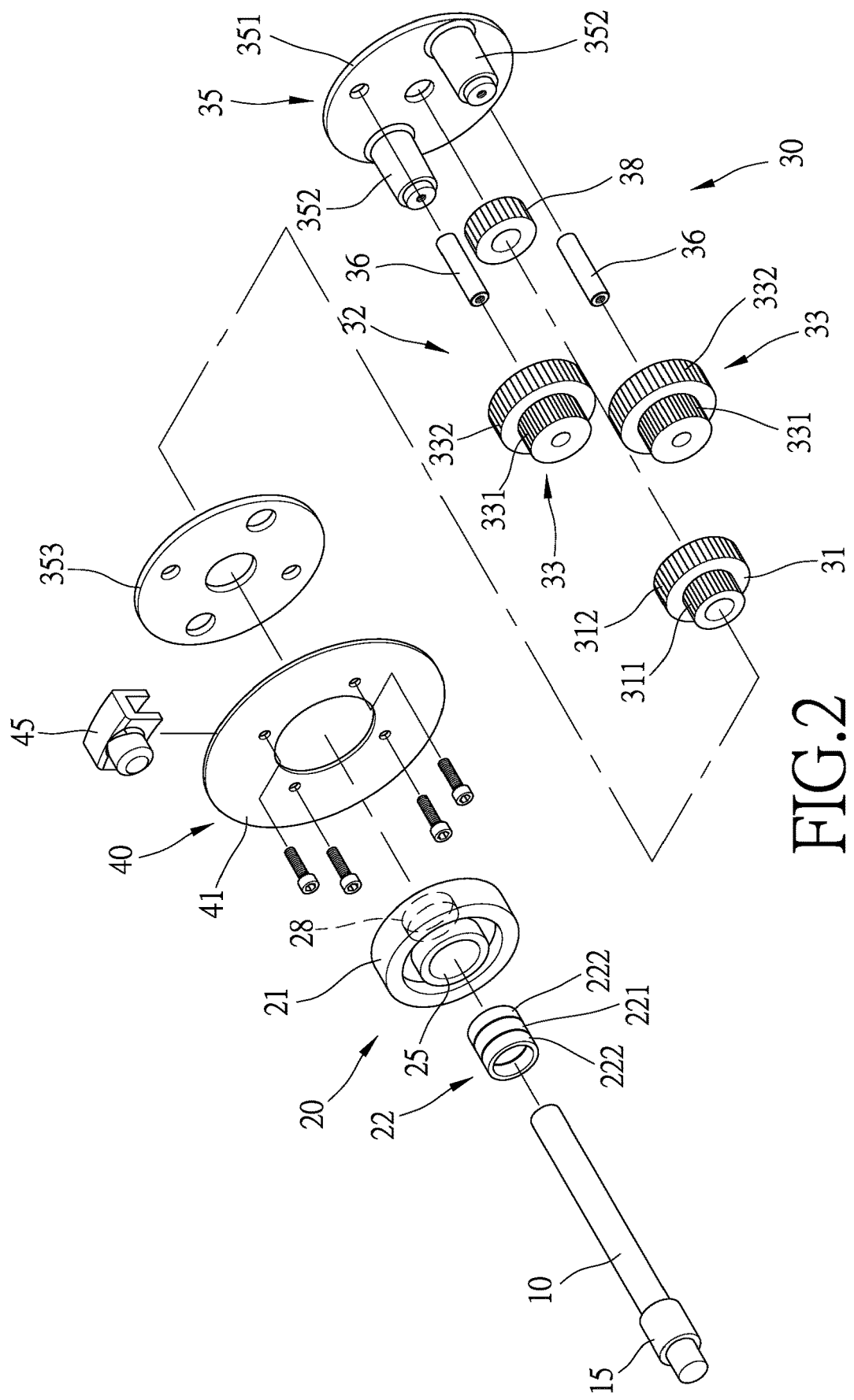
FIG. 2 is an exploded view of the present invention.

As shown in FIGS. 1 and 2, the present invention is structurally formed of an output shaft 10, a transmission module 20, and at least one speed-up module 30, such that the transmission module 20 is acted upon by a power source to drive the output shaft 10 to generate an output and each speed step-up module 30 is operable step up a speed inputted to the transmission module 20.

Figure 3:
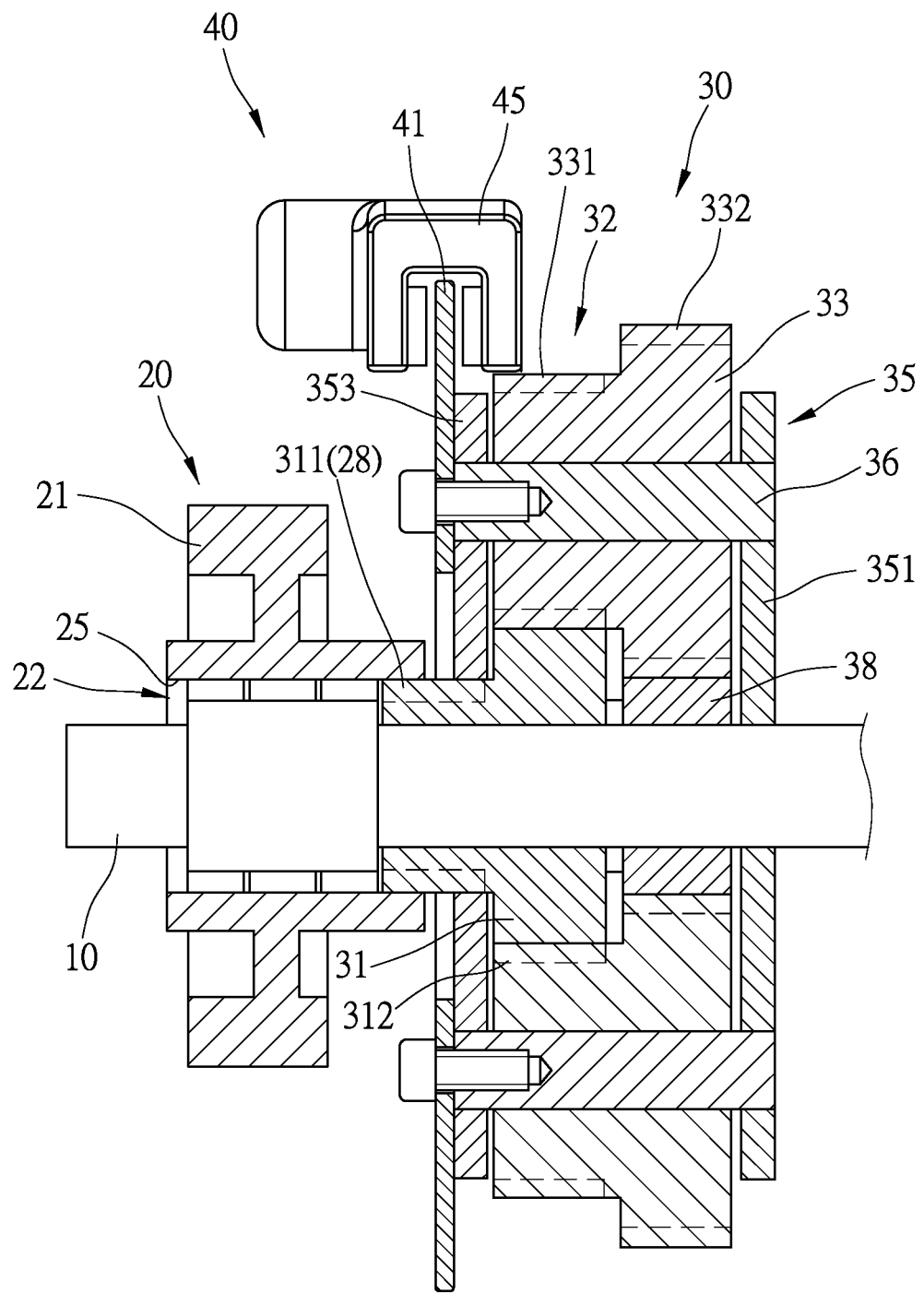
FIG. 3 is a cross-sectional view showing the present invention in an assembled form.

In a preferred embodiment of the present invention, as shown in FIGS. 2 and 3, the output shaft 10 is arranged to extend through the transmission module 20 and each speed step-up module 30 one by one. The output shaft 10 comprises a shaft expansion section 15 on which the transmission module 20 is arranged.

The transmission module 20 comprises a driving roller 21 that is operable to drive the output shaft 10 unidirectionally. The driving roller 21 can be a belt pulley and can be driven by the power source through a belt. Further, the driving roller 21 is mounted on the shaft expansion section 15 of the output shaft 10 by means of a one-way shaft assembly 22. The one-way shaft assembly 22 comprises a one-way bearing 221 and two bearings 222 that are respectively arranged on two opposite sides of the one-way bearing 221. The driving roller 21 is formed, in a center thereof, with a shaft compartment or bore 25 to receive disposition of the one-way shaft assembly 22 therein, so that the driving roller 21 may unidirectionally drive the output shaft 10 to move in a predetermined direction, while idling or load-free rotating in an opposite direction.

The speed step-up module 30 that is fit over the output shaft 10 is collaboratively operating with the transmission module 20 and selectively drives the output shaft 10. Each speed step-up module 30 comprises a connecting gear 31, a planet speed-change wheel assembly 32, a speed step-up gear 38, and an arrestor assembly 40. The connecting gear 31 is rotatably mounted on the output shaft 10. The connecting gear 31 comprises an engaging portion 311, and the driving roller 21 of the transmission module 20 is formed in a center thereof with an engaging portion 28 for mutual engagement with each other, such that the connecting gear 31 is synchronously operable or rotatable with the driving roller 21. The connecting gear 31 is provided, on an outer circumference thereof, with a large-diameter toothed portion 312 for driving the planet speed-change wheel assembly 32. Further, the planet speed-change wheel assembly 32 comprises at least one speed-change gear 33 that synchronously orbits around the connecting gear 31, wherein each speed-change gear 33 comprises a small-diameter toothed portion 331 in mating engagement with the large-diameter toothed portion 312 of the connecting gear 31 and a large-diameter toothed portion 332 of which a diameter is greater than a diameter of the small-diameter toothed portion 331. Further, the speed step-up gear 38 is fixed to the output shaft 10, and a diameter of the speed step-up gear 38 is smaller than the diameter of the large-diameter toothed portion 332 of the speed-change gear 33, and the large-diameter toothed portion 332 of the speed-change gear 33 is in mating engagement with the speed step-up gear 38, in order to achieve an effect of driving the output shaft 10 with a stepped-up speed. According to some embodiments, the planet speed-change wheel assembly 32 may comprise two or more than two speed-change gears 33 that are sequentially in engagement with each other, and a terminal speed-change gear 33 is in mating engagement with the speed step-up gear 38 so as to achieve an effect of more greatly stepping up the speed. Further, the speed-change gear 33 of the planet speed-change wheel assembly 32 is rotatably mounted to a wheel frame 35. The wheel frame 35 comprises at least two mounting pillars 352 each of which has two ends to each of which a frame plate 351 is mounted to receive the output shaft 10 to extend through a center thereof. Each speed-change gear 33 is rotatably mounted between the two frame plates 351, 353 by a wheel shaft 36, so that each speed-change gear 33 drives the wheel frame 35 to do orbiting motion and spinning motion about the output shaft 10. Further, the arrestor assembly 40 is arranged on the planet speed-change wheel assembly 32 to selectively stop the orbiting motion of the speed-change gear 33 of the planet speed-change wheel assembly 32 relative to the output shaft 10. In the present invention, the arrestor assembly 40 comprises a disc plate 41 fixedly mounted to one side of the wheel frame 35 of the planet speed-change wheel assembly 32 and a stopping member 45 arranged on a circumference of the disc plate 41 to selectively stop rotation of the disc plate 41 so as to simultaneously stop the orbiting motion of the speed-change gear 33 of the planet speed-change wheel assembly 32 relative to the output shaft 10. The stopping member 45 can be a caliper, an electromagnetic device, and a brake pad.

In this way, the transmission module 20 can be activated to drive the output shaft 10 to generate an output of an initial speed position, and an arresting operation of the arrestor assembly 40 may be used to make the speed step-up module 30 selectively step up an output speed of the output shaft 10, so as to thereby form a planetary speed-change mechanism.

Figure 4:
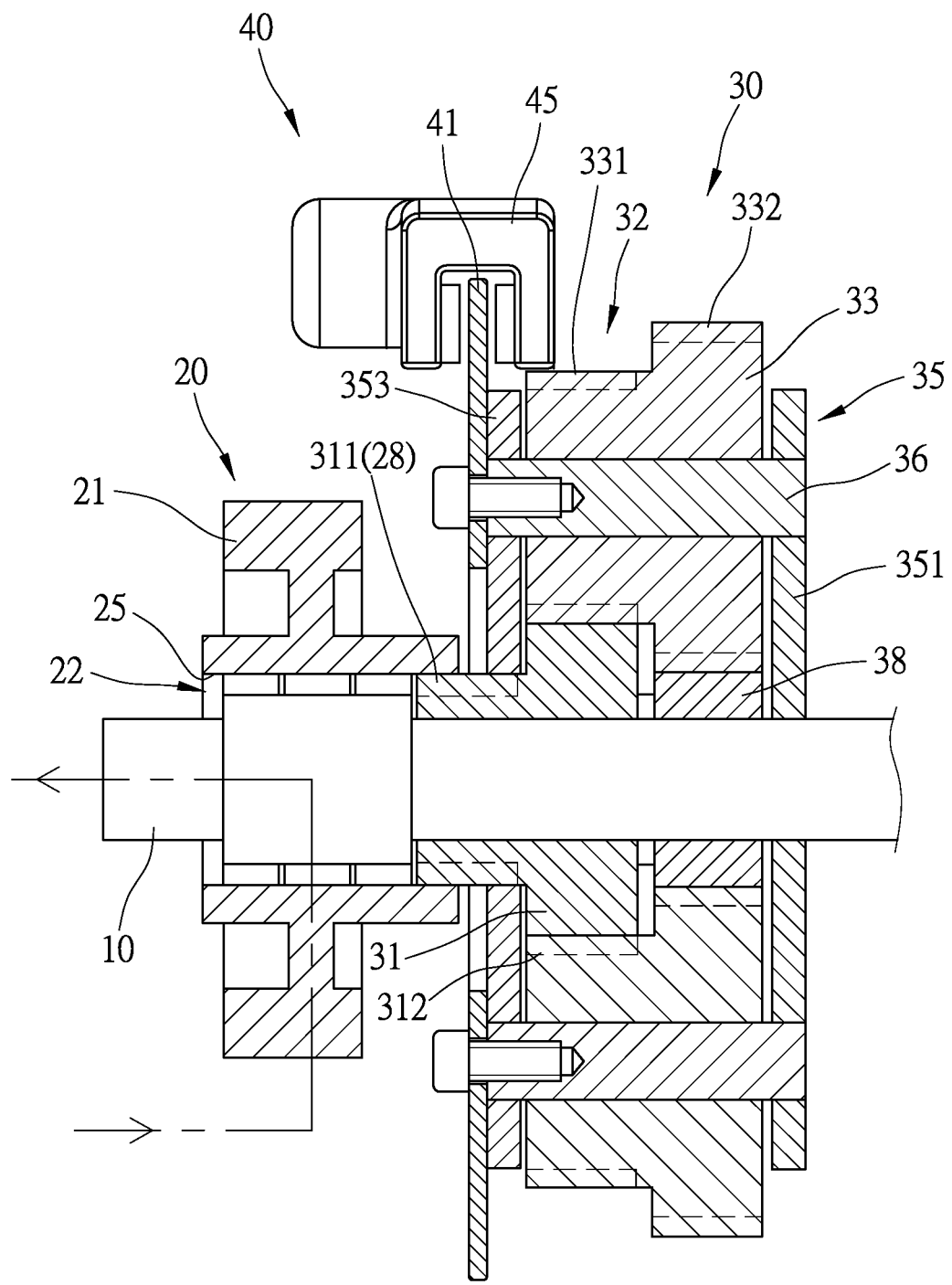
FIG. 4 is a cross-sectional view showing the present invention at an initial position.

Concerning the operation of the present invention, when it is desired to have the output shaft 10 rotating at the initial position, as shown in FIGS. 1 and 4, the arrestor assembly 40 of the speed step-up module 30 is not activated, and under such a condition, with the power source driving the driving roller 21 of the transmission module 20, the driving roller 21 drives directly, by means of the one-way shaft assembly 22, the output shaft 10 to rotate in synchronization therewith, while the driving roller 21 synchronously drives the connecting gear 31 of the speed step-up module 30 to rotate to have the connecting gear 31 acting on the speed-change gear 33 of the planet speed-change wheel assembly 32 that is in mating engagement therewith, making the speed-change gear 33 of the planet speed-change wheel assembly 32 not in interference with the speed step-up gear 38 mounted on the output shaft 10, whereby the output shaft 10 is set to provide an output of speed at the initial position.

Figure 5:
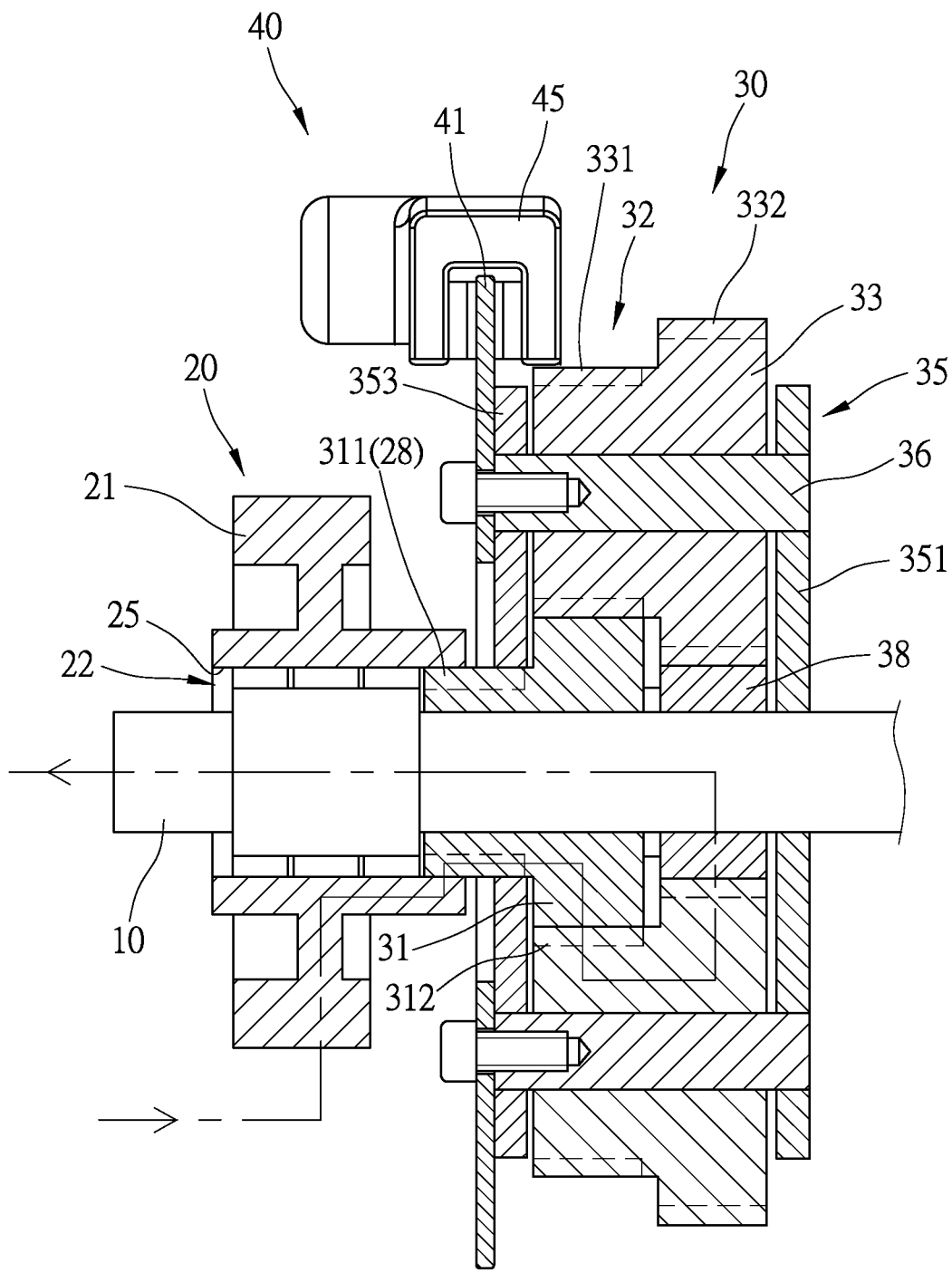
FIG. 5 is a cross-sectional view showing the present invention at a speed-increased position.

When it is desired to step up the speed, as shown in FIGS. 1 and 5, the arrestor assembly 40 of the speed step-up module 30 is activated to stop the orbiting motion of the speed-change gear 33 of the planet speed-change wheel assembly 32 by means of for example having the stopping member 45 of the arrestor assembly 40 tightly clamp the disc plate 41 to fixedly hold the wheel frame 35 of the speed step-up module 30 that is fixed to the disc plate 41 and simultaneously stop the orbiting motion of the speed-change gear 33 relative to the speed step-up gear 38. Since the connecting gear 31 of the speed step-up module 30 is coupled to the driving roller 21 of the transmission module 20, the connecting gear 31 synchronously drive the speed-change gear 33 in mating engagement therewith to do spinning motion and thus each speed-change gear 33 synchronously drive the speed step-up gear 38 in mating engagement therewith. Since the connecting gear 31 engages the small-diameter toothed portion 331 of the speed-change gear 33 by means of the large-diameter toothed portion 312 and the large-diameter toothed portion 332 of the speed-change gear 33 engages the speed step-up gear 38 that is of a relatively small diameter, the speed that the speed step-up gear 38 drives the output shaft 10 to output is increased relative to an input speed of the driving roller 21. Further, since the one-way shaft assembly 22 that includes the one-way bearing 221 is arranged between the output shaft 10 and the driving roller 21 of the transmission module 20, when the output shaft 10 is rotating at a speed higher than that of the driving roller 21, an effect of idling in an opposite direction achieved with the one-way shaft assembly 22 would prevent the output shaft 10 that is rotating at a relatively high speed from interfering with the driving roller 21 of a speed of the initial position, allowing the output shaft 10 to generate an output of speed that corresponds to a speed-up position.

It is understood from the description and arrangement provided above that the present invention provides the one-way shaft assembly 22 to mount the driving roller 21 of the transmission module 20 on the output shaft 10 and also additionally provides the speed step-up module 30 that is mounted to the output shaft 10 to rotate in unison with the driving roller 21, and the speed step-up module 30 also comprises the planet speed-change wheel assembly 32 that is selectively stopped by means of the arrestor assembly 40, so that when a low speed is desired, the planet speed-change wheel assembly 32 of the speed step-up module 30 is set in an idling condition as being orbiting about the output shaft 10 to allow the power source to drive, by means of the driving roller 21, the output shaft 10 unidirectionally to generate a speed at the initial position, and when it is desired to step up the speed, the arrestor assembly 40 is activated to stop the orbiting motion of the planet speed-change wheel assembly 32 to allow the planet speed-change wheel assembly 32 to drive, by means of the speed-change gear 33, the output shaft 10 to achieve stepping up speed, and is also set in an idling rotation condition with respect to the driving roller 21 by means of the one-way shaft assembly 22 to prevent interference between the driving roller 21 that is at the speed of the initial position and the output shaft 10 that is now at the stepped-up speed. The present invention provides the following advantages:

(1) The present invention provides the transmission module 20 to be mounted by means of the one-way shaft assembly 22 on the output shaft 10, while the speed step-up module 30 that is operatively in connection with the transmission module 20 is arranged to drive, by means of the planet speed-change wheel assembly 32, the speed step-up gear 38 arranged on the output shaft 10 so as to enable stepping-up of speed by selectively stopping an orbiting motion of the planet speed-change wheel assembly 32, and, thus, compared to the existing gear train based speed changers, the present invention has a structure that is simple and of a low failure rate and can effectively reduce the size and lower down the fabrication cost.

(2) In changing or increasing speed, the present invention provides the speed-change gear 33 of the planet speed-change wheel assembly 32 of the speed step-up module 30 to do a spinning motion for driving the speed step-up gear 38 mounted on the output shaft 10 and, thus, compared to the existing continuously variable transmission devices, the present invention does not exhibit any kinetic energy loss due to no frictional force being involved in increasing speed, so that the present invention features both high efficiency and high reliability.

(3) For an initial speed at the initial position of the present invention, the speed step-up gear 38 of the speed step-up module 30 is in rotation in unison with the output shaft 10, so that speed increase can be achieved by having the speed-change gear 33 of the speed step-up module 30 transferring from a condition of being in orbiting motion relative to the speed step-up gear 38 to a spinning motion, the speed can be directly increased, without the need of increasing from a stationary condition as required in the prior art, and thus, the transferring is fast and no window period is existing, and also no pause may occur during speed change thereby improving smoothness of speed change.

We claim:

1. A planetary speed-change mechanism, comprising:
   an output shaft;
   a transmission module, which is mounted on the output shaft, the transmission module comprising a driving roller that is operable to drive the output shaft in a single direction; and
   at least one speed step-up module, which is mounted on the output shaft, the speed step-up module comprising a connecting gear, a planet speed-change wheel assembly, a speed step-up gear, and an arrestor assembly, wherein the connecting gear is rotatably mounted on the output shaft and is in operative coupling with the driving roller; the speed step-up gear is fixedly mounted to one end of the output shaft; and the planet speed-change wheel assembly comprises at least one speed-change gear, each of the at least one speed-change gear comprising a small-diameter toothed portion in mating engagement with the connecting gear and a large-diameter toothed portion in mating engagement with the speed step-up gear;
   wherein in a low-speed position, the planet speed-change wheel assembly of the speed step-up module is in idling rotation as being set in an orbiting motion so that an input of power is supplied through the driving roller to drive the output shaft in the single direction; and in a high-speed position, the arrestor assembly is activated to stop the orbiting motion of the planet speed-change wheel assembly, so as to have the speed-change gear of the planet speed-change wheel assembly switching from the orbiting motion relative to the speed step-up gear to a spinning motion to step the speed up;
   wherein the output shaft comprises a shaft expansion section, the driving roller of the transmission module being mounted by means of a one-way shaft assembly to the shaft expansion section, and the driving roller is formed, in a center thereof, with a shaft compartment in which the one-way shaft assembly is arranged, so that the driving roller is operable to drive the output shaft in the single direction and is in idling rotation in an opposite direction; and
   wherein the planet speed-change wheel assembly comprises two or more than two speed-change gears that are sequentially in engagement with each other and a terminal one of the two or more than two speed-change gears is in mating engagement with the speed step-up gear to improve speed stepping up.

2. The planetary speed-change mechanism according to claim 1, wherein the driving roller of the transmission module comprises a belt pulley and is driven by a power source through a belt.

3. The planetary speed-change mechanism according to claim 2, wherein the driving roller of the transmission module is formed, in a center thereof, with an engaging portion, with which an engaging portion of the connecting gear of the speed step-up module is in mating engagement to have the connecting gear of the speed step-up module and the driving roller moving in synchronization with each other.

4. The planetary speed-change mechanism according to claim 1, wherein the driving roller of the transmission module is formed, in a center thereof, with an engaging portion, with which an engaging portion of the connecting gear of the speed step-up module is in mating engagement to have the connecting gear of the speed step-up module and the driving roller moving in synchronization with each other.

5. The planetary speed-change mechanism according to claim 1, wherein the connecting gear has an outer circumference that is formed with a large-diameter toothed portion with which the small-diameter toothed portion of the speed-change gear of the planet speed-change wheel assembly is in mating engagement, and the speed step-up gear has a diameter that is smaller than a diameter of the large-diameter toothed portion of the speed-change gear in order to achieve driving the output shaft with a stepped-up speed.

6. The planetary speed-change mechanism according to claim 5, wherein the speed-change gear of the planet speed-change wheel assembly is rotatably mounted on a wheel frame, and the wheel frame comprises at least two mounting pillars each of which has two ends to each of which a frame plate is mounted to receive the output shaft to extend through a center of the frame plate, each of the at least one speed-change gear being rotatably mounted between the two frame plates by means of a wheel shaft.

7. The planetary speed-change mechanism according to claim 6, wherein the arrestor assembly comprises a disc plate fixedly mounted to one side of the wheel frame of the planet speed-change wheel assembly and a stopping member arranged on a circumference of the disc plate to selectively stop rotation of the disc plate so as to simultaneously stop the orbiting motion of the speed-change gear of the planet speed-change wheel assembly relative to the output shaft.

8. The planetary speed-change mechanism according to claim 7, wherein the stopping member of the arrestor assembly comprises a caliper.

9. The planetary speed-change mechanism according to claim 1, wherein the speed-change gear of the planet speed-change wheel assembly is rotatably mounted on a wheel frame, and the wheel frame comprises at least two mounting pillars each of which has two ends to each of which a frame plate is mounted to receive the output shaft to extend through a center of the frame plate, each of the at least one speed-change gear being rotatably mounted between the two frame plates by means of a wheel shaft.

10. The planetary speed-change mechanism according to claim 9, wherein the arrestor assembly comprises a disc plate fixedly mounted to one side of the wheel frame of the planet speed-change wheel assembly and a stopping member arranged on a circumference of the disc plate to selectively stop rotation of the disc plate so as to simultaneously stop the orbiting motion of the speed-change gear of the planet speed-change wheel assembly relative to the output shaft.

11. The planetary speed-change mechanism according to claim 10, wherein the stopping member of the arrestor assembly comprises a caliper.

12. The planetary speed-change mechanism according to claim 1, wherein the speed-change gear of the planet speed-change wheel assembly is rotatably mounted on a wheel frame, and the wheel frame comprises at least two mounting pillars each of which has two ends to each of which a frame plate is mounted to receive the output shaft to extend through a center of the frame plate, each of the at least one speed-change gear being rotatably mounted between the two frame plates by means of a wheel shaft.

13. The planetary speed-change mechanism according to claim 12, wherein the arrestor assembly comprises a disc plate fixedly mounted to one side of the wheel frame of the planet speed-change wheel assembly and a stopping member arranged on a circumference of the disc plate to selectively stop rotation of the disc plate so as to simultaneously stop the orbiting motion of the speed-change gear of the planet speed-change wheel assembly relative to the output shaft.

14. The planetary speed-change mechanism according to claim 13, wherein the stopping member of the arrestor assembly comprises a caliper.

* * * * *